United States Patent
Godbersen (10) Patent No.: US 6,863,490 B2
(45) Date of Patent: Mar. 8, 2005

(54) TRAILER FOR TRANSPORTING BOAT HOIST

(76) Inventor: Byron L. Godbersen, Lake LaJune Estates, Ida Grove, IA (US) 51445

( * ) Notice: Subject to any disclaimer, the term of this patent is extended or adjusted under 35 U.S.C. 154(b) by 115 days.

(21) Appl. No.: 10/303,360

(22) Filed: Nov. 25, 2002

(65) Prior Publication Data

US 2004/0101389 A1 May 27, 2004

(51) Int. Cl.$^7$ .................................................. B60P 1/28
(52) U.S. Cl. ....................................... 414/482; 414/812
(58) Field of Search ............................... 414/482, 483, 414/498, 474, 476, 458, 803, 812; 280/414.1, 414.2

(56) References Cited

U.S. PATENT DOCUMENTS

| | | | |
|---|---|---|---|
| 2,910,197 A | * 10/1959 | Beckner | 414/477 |
| 2,977,011 A | * 3/1961 | Okerlund | 414/477 |
| 4,223,856 A | * 9/1980 | DiVincenzo | 244/50 |
| 4,401,335 A | 8/1983 | Godbersen | |
| 4,488,612 A | * 12/1984 | Patterson | 180/14.1 |
| 4,685,855 A | * 8/1987 | Celli | 414/482 |
| 4,836,569 A | 6/1989 | Godbersen | |
| 5,076,603 A | 12/1991 | Godbersen | |
| 5,308,213 A | * 5/1994 | Gilbertson | 414/482 |
| 5,649,802 A | * 7/1997 | Babcock | 414/483 |
| 5,975,828 A | * 11/1999 | Weldy | 414/484 |

* cited by examiner

Primary Examiner—Eileen D. Lillis
Assistant Examiner—Charles A. Fox
(74) Attorney, Agent, or Firm—Sturm & Fix LLP (57) ABSTRACT

A trailer for transporting a contemporary boat hoist having a four post rectangular structure with at least a front transversely extended front beam and a pair of side beams, the trailer including a frame having side members mounted on a wheel and axle unit, with a pair of arms pivotally mounted one on each side member of the frame and connected to the unit, with further a front mounted winch cable connected to the arms whereby operation of the winch results in a raising or lowering of the frame, with a second front mounted winch engageable with a front beam to raise the hoist; and an extension support unit mounted on the rear of the trailer and engageable with the hoist side beams to effect vertical movement of the hoist upon vertical movement of the trailer frame.

13 Claims, 8 Drawing Sheets

Fig. 12

TRAILER FOR TRANSPORTING BOAT HOIST

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Invention

The present invention relates generally to a trailer for transporting a boat hoist from a normally land based location overland to another location. More particularly, the invention is directed to a frame mounted on a pivotally mounted wheel and axle unit with winches for raising and lowering the trailer frame via the axle unit, and with outwardly moveable support members for lifting the hoist off the ground such that the trailer can then transport the supported hoist overland.

BACKGROUND ART

Description of the Background

Four post pleasure boat or watercraft lifts are well known in the field for lifting pleasure boats out of the water near the shore for safety and storage during non-use, and for ease of certain maintenance and passage of personnel to and from the boat and docks. Primarily for winter storage of the boat lift in those geographical areas of frozen lake or river water, it is necessary to move the boat lift out of the water, and it may be desirable to transport the boat lift overland. Although certain boat lifts may be provided with wheels for transportation overland, the type of boat lift involved in this instance does not have wheels.

Pleasure boat trailers themselves are also well known, but other than certain types of trailers especially fitted for transporting pantoon boats and the like, the trailer industry has not solved the problem of providing a simple trailer structure for efficiently and economically transporting overland a contemporary four post pleasure boat lift having front and side beams.

It is to the solution of this problem in the marine industry that this invention is directed.

BRIEF SUMMARY OF THE INVENTION

The present invention is directed to a trailer for transporting overland a typical four post boat hoist or lift having at least a front beam and a pair of side beams. The trailer has a standard U or V-shaped frame with a pair of side members diverging from a juncture at their forward ends to parallel, rearwardly extending side portions, which side portions are mounted on a ground engaging wheel and axle unit.

The wheel and axle unit is pivotally mounted to the trailer frame by a pair of arms, each arm pivotally mounted to a side portion, respectively, with the arms movable from a relatively upright position with the trailer frame raised over the ground surface, to a lowered position wherein the trailer frame is in a more lowered position than the raised position. The front end of the trailer is connected by a conventional tongue unit to a prime mover and remains connected during the operation of the trailer in loading and transporting the hoist.

The wheel and axle unit is positioned in an over-center condition relative to the pivoted connection of the mounting arms with the frame side portions; whereby when the arms are released from their normal raised transport positions with the trailer frame in a raised condition relative to the ground surface, the weight of the trailer will cause the arms to automatically pivot to lowered positions whereby the trailer frame is also moved downwardly to a lowered condition.

To effect pivotal upward movement of the arms, a winch and cable unit is mounted on the trailer frame near the front end, with a cable running from the winch to each arm, whereby operation of the winch either draws in the cables to raise the arms to upright positions or releases the cables such that the arms are automatically lowered, with subsequent operation of the winch retracting the cable to pivotally move and raise the arms and thus the trailer frame back to a raised condition.

To lift the hoist above the ground for transport, the trailer frame includes a pair of retractably extendable members adapted, when the trailer frame is in its lowered position, to be extended beneath side portions of the hoist, such that as the trailer frame is raised, the hoist is likewise raised. Operation of the wheel and axle unit by the pivotable arms to raise the frame is supplemented by a second winch unit also mounted on the trailer frame, which second unit is operable to engage the hoist front beam and raise the beam and hoist upwardly toward the stationary trailer. Also to aid movement of the trailer wheels over the hoist front beam during movement of the trailer into and out of positions of the frame within the four posts of the hoist, ramp members carried by the trailer may be placed in front of or behind the hoist front beam for supporting the wheels as they move up and over the front beam.

In operation, the hoist has normally been moved out of its water located position, with all four posts mounted on a ground surface. The lift platform of the hoist is in a raised condition. The trailer is in a transport condition, with the pivot arms held upwardly by the taut cables of the first winch unit such that the trailer frame is in its raised position. The extension support members are retracted and the second winch unit is in the retracted condition.

The trailer is backed over the hoist front beam, normally with the aid of the ramp members, although if the beam is low enough, the ramp members may not be necessary. The main portion of the trailer frame is centered between the hoist post, and the second winch unit is stationed generally above the front beam, with the rear of the trailer frame where the extension support members are mounted located within the rectangular confines of the hoist. The rear of the trailer is spaced slightly forward, a foot or so, from the rear of the hoist.

The first winch unit is then operated to release the cables whereby the over-center pivot arms automatically, pivotally lower the trailer frame to a lowered position due to the weight of the trailer. The second winch unit cable may then be engaged with the front beam and retracted by the winch to lift the front of the trailer frame upwardly toward and in engagement with the trailer frame. Also, the support members may be extended to positions beneath the hoist side portions, where a retraction of the cables by the first winch unit effects a raising of the entire hoist, such that the hoist is lifted above the ground surface for safe transport purposes.

The hoist may then be transported by the prime mover pulling the trailer and hoist as a unit. At the destination of the hoist, the second winch unit cable is released from the hoist front beam and retracted to its non-use condition, the first winch unit is operated to release the cables whereby the trailer frame and the hoist are both automatically lowered, with the hoist again attaining a ground engaging position, and the extension supports are then retracted within the frame framework.

With the wheel and axle unit raised back to its uppermost position, and with or without the use of the ramp members, the trailer is then pulled out of the hoist confines with the wheels moved up and over the hoist front beam; the trailer then being ready for another hoist transport operation.

A primary object of the present invention is to provide a new and novel trailer for transporting overland a four post-type boat lift or hoist, and method of loading and transporting the hoist.

Yet another object of the present invention is the provision of a wheel mounted trailer which may be backed into a position partially within the confines of the hoist, whereby the trailer may raise the hoist to a transport position, transport the hoist, then lower the hoist to a ground engaged position, and be pulled out and away from the hoist.

Still another object of the present invention is the provision of a wheel mounted trailer connected to a prime mover for moving into the rectangular confines of a four-post boat hoist, lifting up the hoist off of a ground engaging position, transporting the hoist, lowering the hoist back to the ground engaging position, and moving out of the hoist confines.

Another object of this invention is to provide a wheel mounted trailer for transporting a four post boat hoist from one ground engaged position to another position without changing or altering any of the hoist structure.

An additional advantage of the present invention is the provision for accommodating various sized four post boat lifts and hoist.

Another object of the present invention is the provision of a standard boat trailer modified with a minimum of change while still using standard trailer components to render the trailer capable of transporting overland a contemporary four post-type boat lift or hoist.

Other objects, advantages and novel features of the present invention will become apparent from the following detailed description of the invention when considered in conjunction with the accompanying drawings.

DETAILED DESCRIPTION OF THE INVENTION

Figure 2:
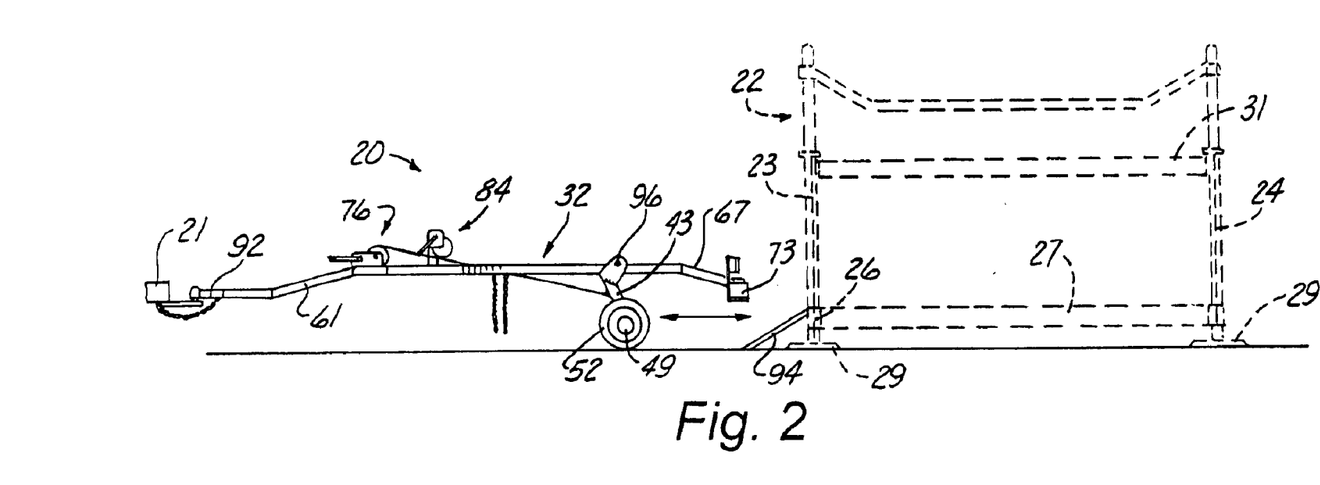
FIG. 2 is a reduced, side elevational view of the boat trailer of the present invention shown in a ground engaging position in front of a boat hoist, the hoist shown in dash lines, with a ramp in place.
Figure 14:
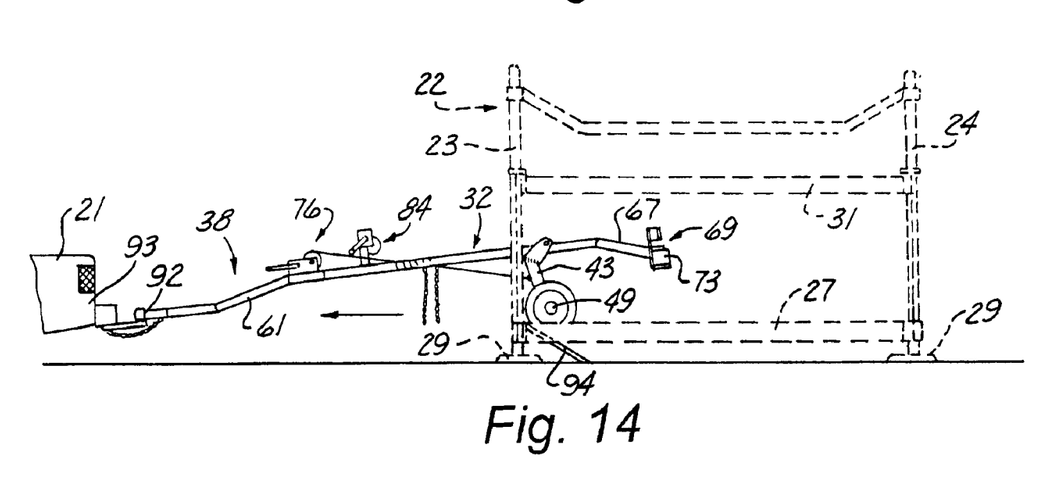
FIG. 14 is a view similar to FIG. 13, with the hoist lowered to a ground engaging position and the trailer being moved out from the rectangular confines of the hoist.

Referring now to the drawings, the present invention is directed generally to a trailer (20) connected to a prime mover (21) only the rear of which is illustrated, for transporting overland a contemporary four post boat hoist or lift (22) from one location (FIG. 2) to another location (FIG. 14).

Figure 4:
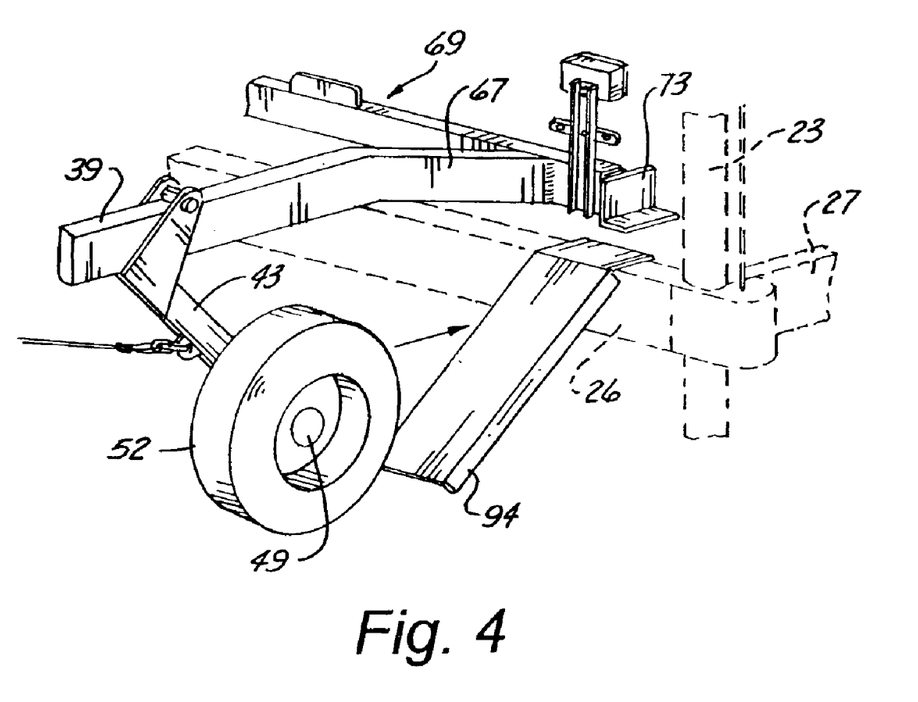
FIG. 4 is an enlarged, detail fragmentary perspective view of the trailer shortly before it engages the ramp.
Figure 7:
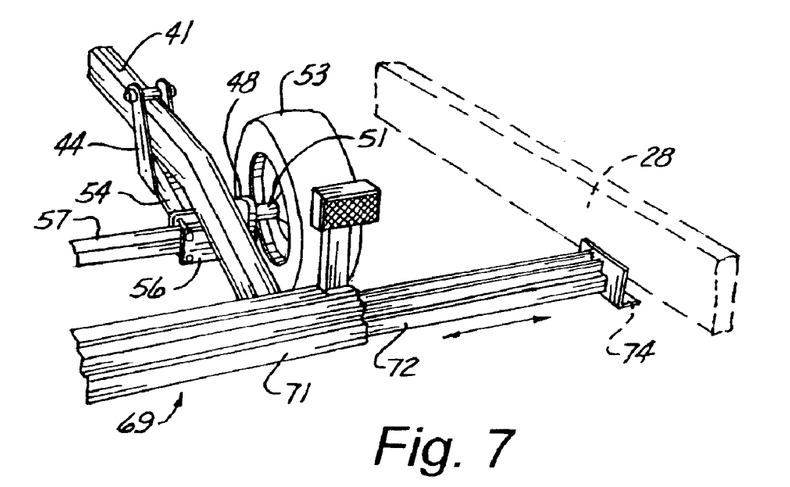
FIG. 7 is an enlarged fragmentary, detail perspective view of one rear corner of the trailer, showing a support member in an extended position.
Figure 12:
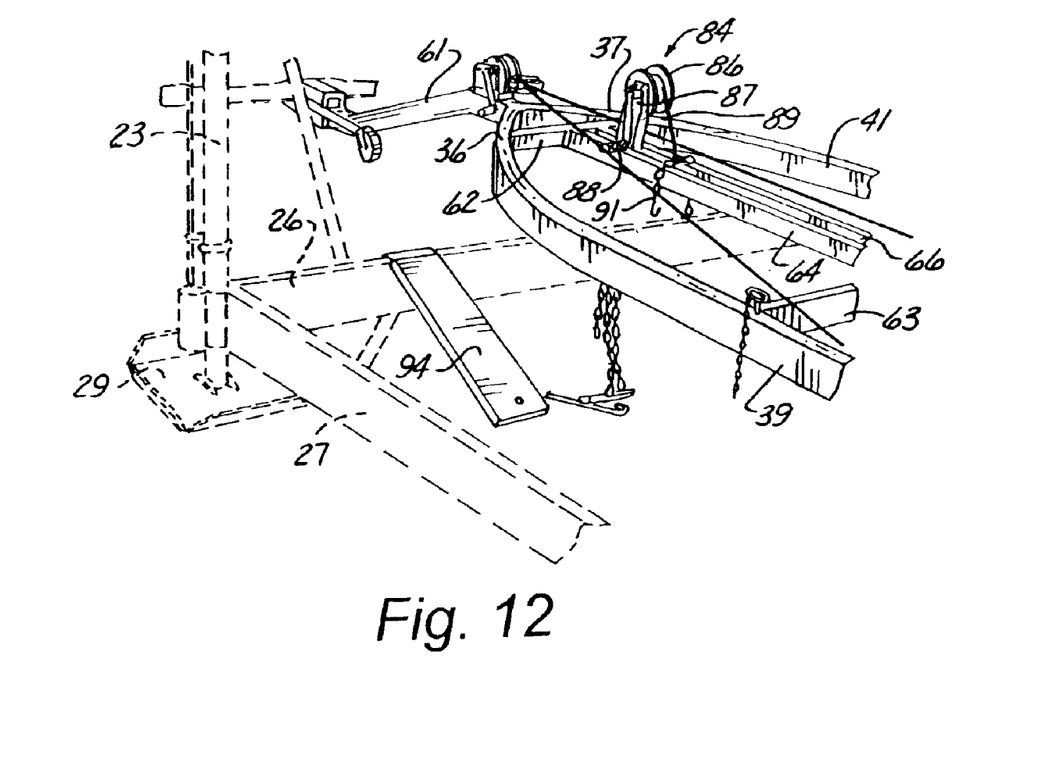
FIG. 12 is an enlarged, fragmentary, detail perspective view of the front end of the trailer showing both winch units.

The boat hoist (22) is of a conventional type as shown in U.S. Pat. No. 4,401,335 issued Aug. 30, 1983, and includes a quartet of posts arranged in a rectangular structure with a pair of transversely spaced front posts, only one left front post (23) showing, and a pair of transversely spaced rear posts, only one left rear post (24) (FIG. 2) showing. The front posts are connected by a front beam (26) (FIGS. 4 and 12); and each pair of left front and left rear posts (23), (24), respectively, and right front (25) and right rear (not shown) posts are interconnected, respectively, by a pair of side beams (27) (FIG. 12), (28) (FIG. 7). For raising and lowering a watercraft (not shown) when the boat hoist (22) is located in water, with base pads (29) for all the posts lowered to a lake or river bed engaging position, a vertically movable platform (31) (FIG. 2) is provided, slidably mounted on the posts. For purposes of this invention, the platform (31) is moved to a raised position on the hoist (22) for purposes clearly seen hereinafter.

The trailer (20) (FIG. 1) comprises generally a U- or V-shaped frame (32) with a pair of side frame members (33), (34) diverging from a juncture at their forward end, (36), (37), with a tongue unit (38), to parallel, rearwardly extending side frame portions (39), (41), which portions (39), (41) are mounted on a ground engaging wheel and axle unit (42).

Figure 1:
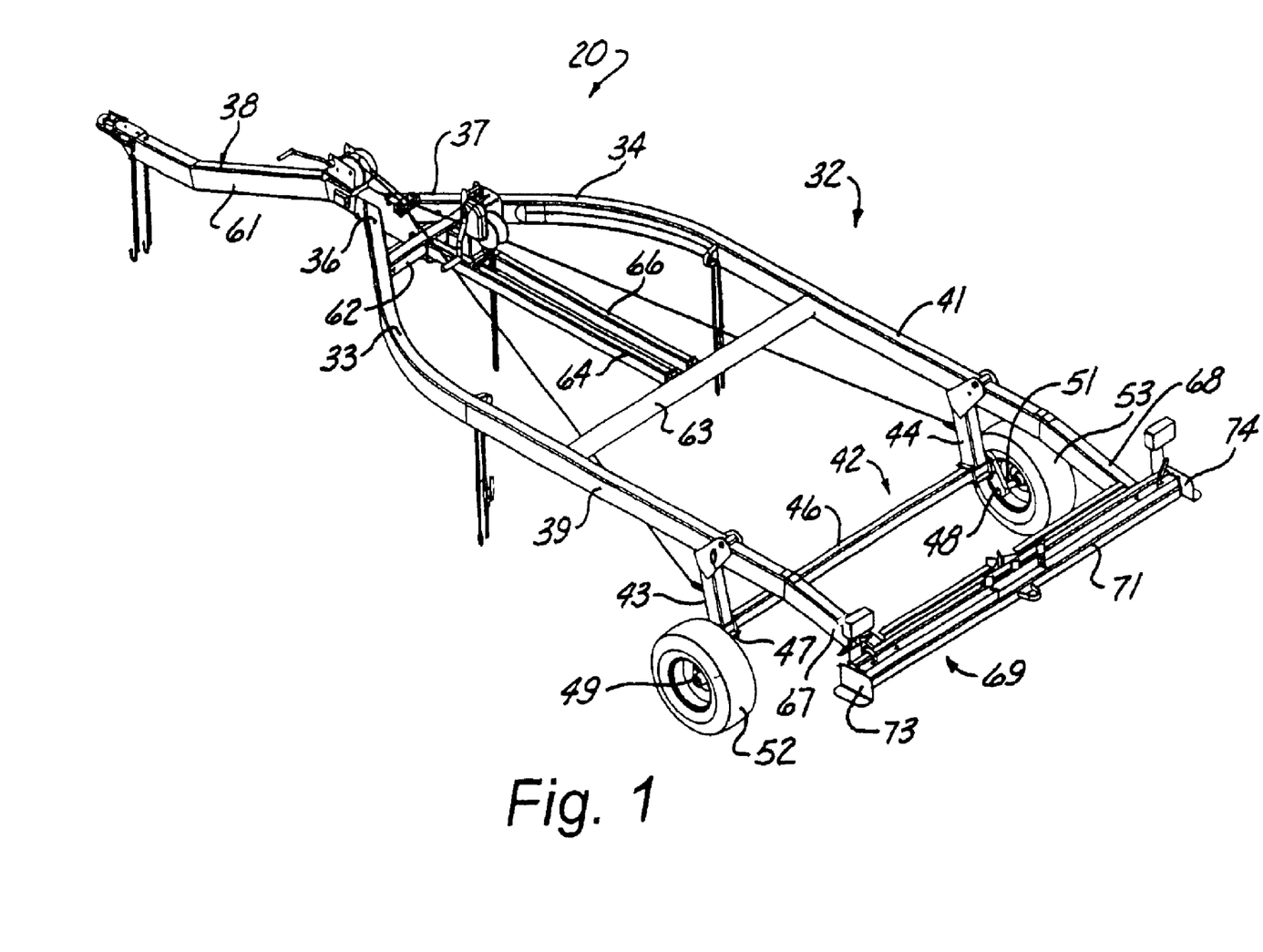
FIG. 1 is a perspective view of the present invention.

The wheel and axle unit (42) is pivotally mounted to the trailer frame (32) by a pair of arms (43), (44), each arm (43), (44) pivotally mounted to a side frame portion (39), (41), respectively (FIG. 1). The unit (42) includes an axle (46) extended between a pair of torsion bars (47), (48) rockably connected to wheel spindles (49), (51) for rotatably supporting the wheels (52), (53), and the lower ends (54) of the pivot arms (43), (44) are secured to bracket units (56) (FIG. 7) connected to the outer ends (57) of the axle (46).

Figure 8:
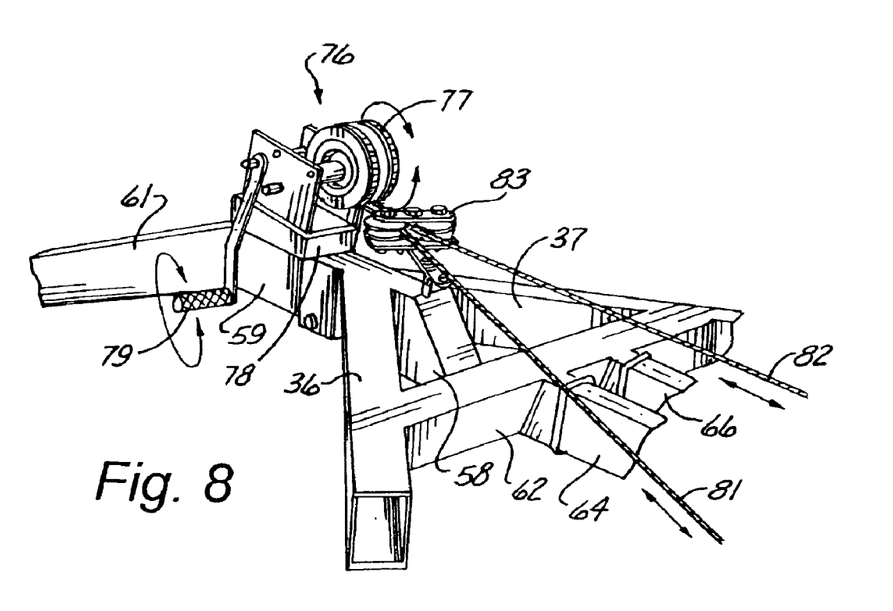
FIG. 8 is an enlarged fragmentary detail perspective view of the tongue end of the trailer and showing a first winch unit.

The trailer frame (32), more particularly, includes a tongue channel (58) (FIG. 8) for receiving the rear end (59) of the tongue (61), a front crossmember (62) and a middle crossmember (63) (FIG. 1), with a pair of winch support tubes (64), (66) extended in a close, side-by-side, parallel arrangement between the front and middle crossmembers (62), (63), with the longitudinal axis of the trailer frame (32) running between the tubes (64), (66).

The rear ends (67), (68) of the frame side portions (39), (41) (FIG. 1) are disposed at a slight downwardly extended angle (see FIG. 2) relative to the remainder of the side-frame members (33), (34), and support a rear extension support unit (69). The support unit (69) includes a channel member (71) (FIG. 7) for holding a pair of hoist support members (72) (FIG. 7), only one showing, within its channel. The support members each has a support flange (73), (74) (FIG. 1) secured at its outer exposed end, and with each member (72), for example, movable outwardly and inwardly of the channel member (71) for a purpose explained more in detail hereinafter.

Figure 11:
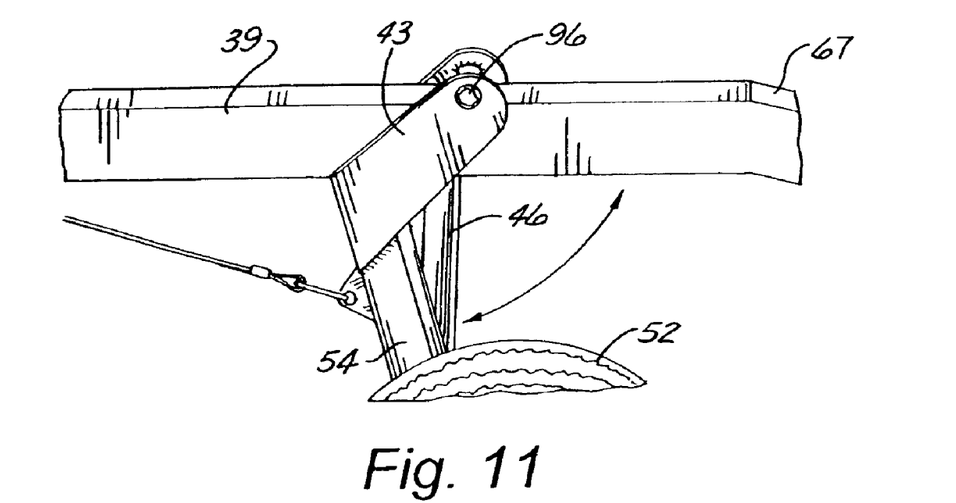
FIG. 11 is an enlarged, fragmentary, detail perspective view of one side of the trailer showing a wheel and axle, pivotally mounted arm unit.

At the front of the trailer frame (32) (FIG. 8), a winch unit (76) is provided for pivotally raising and lowering the wheel and axle unit (42) relative to the trailer frame (32). The winch unit (76) includes a split drum (77) mounted on a rear portion (78) of the tongue unit (38), and rotated by a handle (79) for letting out, or winding up, a pair of cables (81), (82) trained through a dual pulley unit (83); the outer ends of the cables (81), (82) connected, respectively, to the left and right pivot arms (43), (44) (FIGS. 1 and 11).

Behind the forward winch unit (76) is a second rear winch unit (84) also including a single pulley (86) mounted on a standard (87), the base of which is in turn slidably mounted on the support tubes (64), (66), with a handle (88) for retating the pulley (86) to move a cable (89) having a chain (91) at its outer end.

In operation, the trailer (20) is positioned such that the pivot arms (43), (44) (FIG. 2) are pivoted forward to a condition raising the trailer to its highest position from a ground surface, by operation of the forward winch unit (76). The hoist (22) has been removed from deep water to a dry ground engaging position or at least is placed in shallow water, with the lift platform (31) in its raised position. The tongue unit coupler (92) is connected to a prime mover, only the rear (93) of which is shown. A plate (94) (FIG. 4) normally carried by the trailer (20), is placed on the ground and up against the front beam (26) to form a ramp. Although the plate (94) may have a width equal at least to the width of the wheels (52), (53), in the present instance a pair of plates are used, the plates (94) spaced across the front of the hoist (22) such as to be engaged by the wheels (52), (53), respectively.

Figure 3:
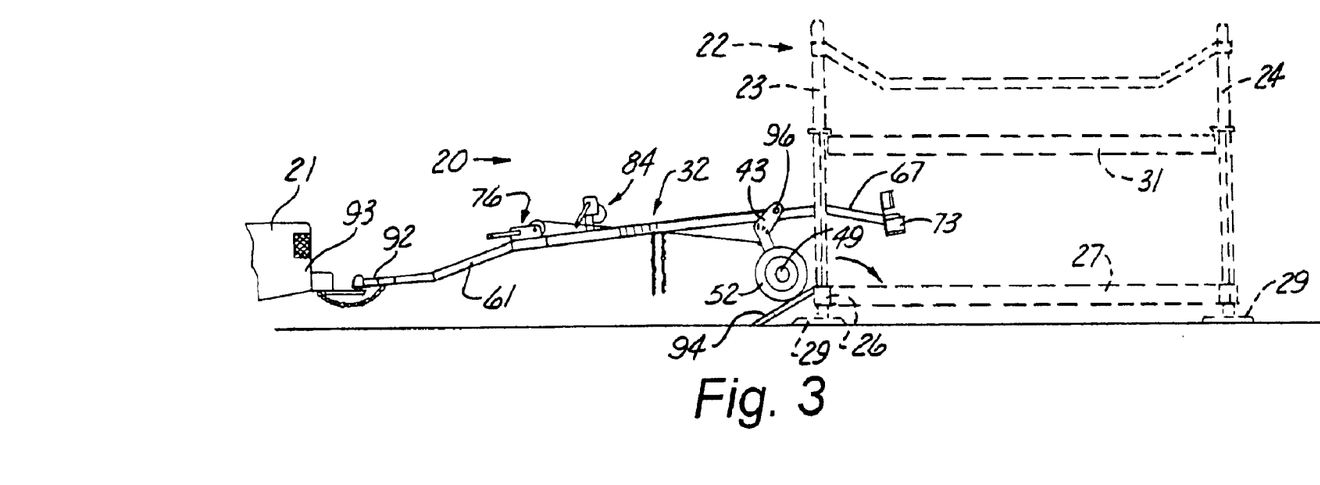
FIG. 3 is a view similar to FIG. 2, with the trailer backed by its prime mover up on the ramp.
Figure 5:
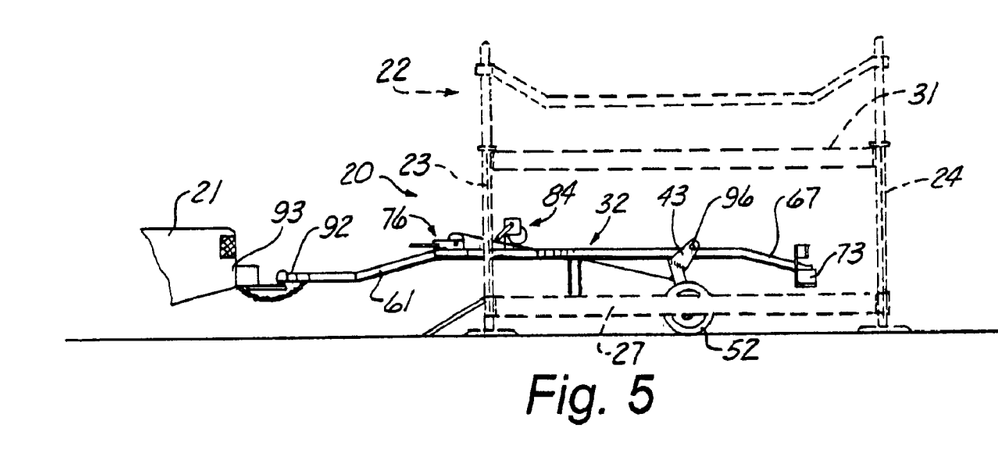
FIG. 5 is a view similar to FIG. 3 with a sufficient part of the trailer located within the rectangular confines of the hoist for effecting vertical movement of the hoist.

The prime mover (93) is then backed up such that the wheels (52), (53) move up on the ramp plates (94) and over the hoist front beam (26) (FIG. 3), and with the rear portion of the trailer (20) backed into the hoist (22) with the wheels (52), (53) centered transversely between the side beams (27), (28), and with the rear winch unit (84) located approximately over the front beam (26) (FIG. 5). If not, the unit (84) may be longitudinally adjusted on the support tubes (64), (66) for placement over the front beam (26); or the trailer (20) may be repositioned within the hoist (22). Further, although there is sufficient clearance between the beam (26) and the underside of the trailer frame (32) in the raised position of the frame (32) (FIG. 5), the plate (94) may have an obtuse V-shape for draping over the beam (26) to provide a ramp on both sides of the beam (26).

Figure 6:
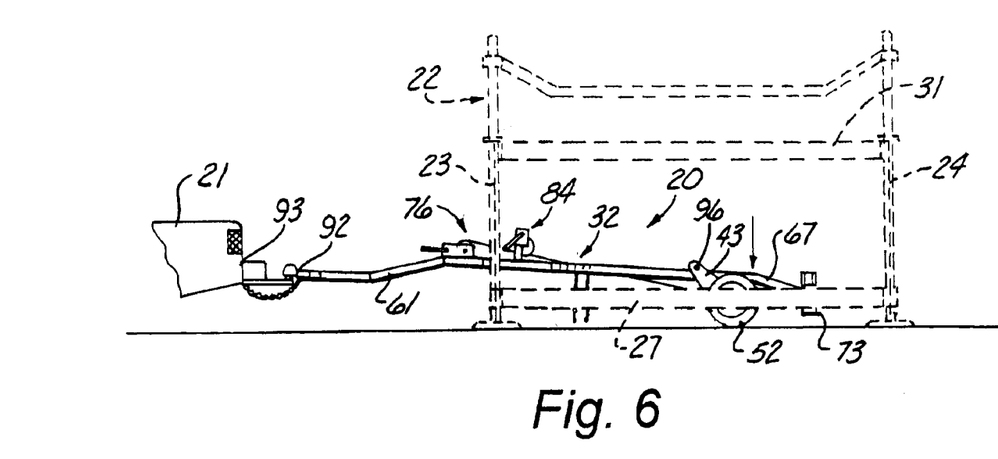
FIG. 6 is a view similar to FIG. 4 with the frame of the trailer moved to a lowered condition as compared to FIG. 5.

The forward winch unit (76) is then operated to release and let out the cables (81), (82). As the pivot points (96) of the pivot arms (43), (44) are located forwardly of the wheel spindles (51), this over-center arrangement results in the pivot arms (44), (46) pivoting counterclockwise as viewed in FIG. 6, or rearwardly whereby the trailer frame (32) is lowered about its tongue coupler (92) to the position best shown in FIG. 6.

Figure 9:
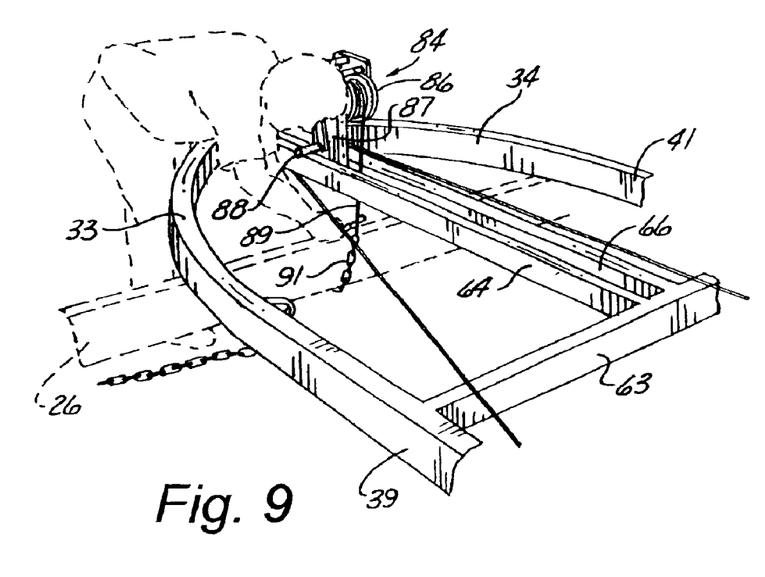
FIG. 9 is a view similar to FIG. 8, showing a second winch unit, and illustrating further an operator-shown in dash lines, connecting a chain of the second winch unit to a front beam of the hoist.

In this position, the hoist support members (72) may be slid outwardly from each end of the channel member (71) until each flange (73), (74) (FIG. 7) is tight against its respective side beam (27), (28). A clamp unit (not shown) may be provided at each outer end of the channel member (71) for releasably locking the support members (72) in their support places for safety of hoist transportation. The chain (91) of the rear winch unit (84) is then wrapped around the front beam (26) (FIG. 9) and the unit (84) operated to raise the hoist front beam (26) until it is engaged against the bottom of the frame (32).

Figure 10:
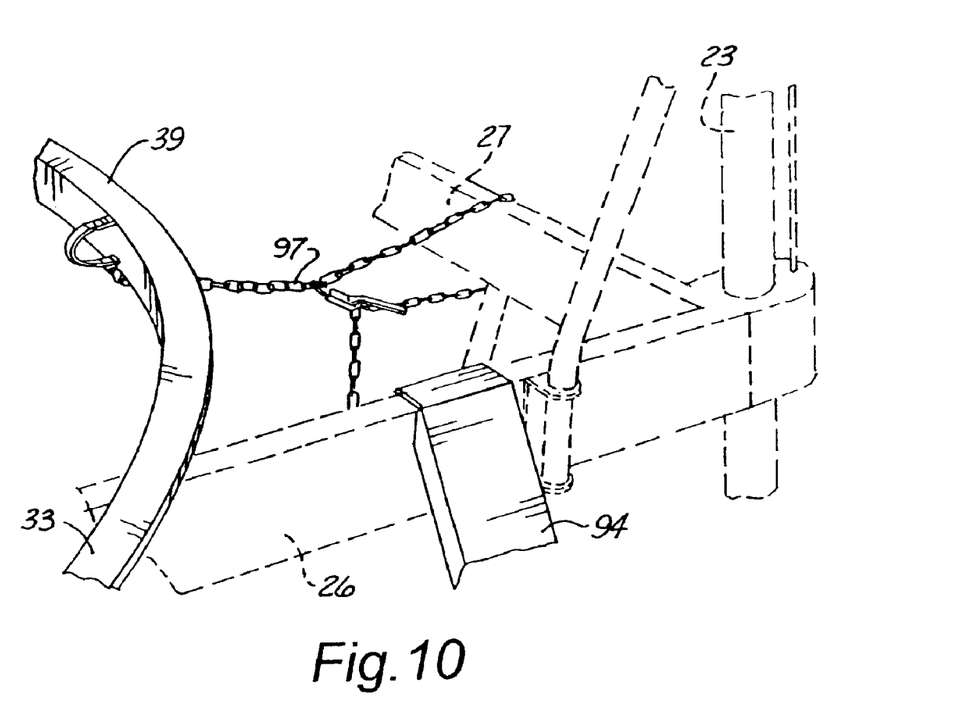
FIG. 10 is an enlarged, fragmentary detail perspective view of a front corner of the trailer in relation to an adjacent front corner of the hoist.
Figure 13:
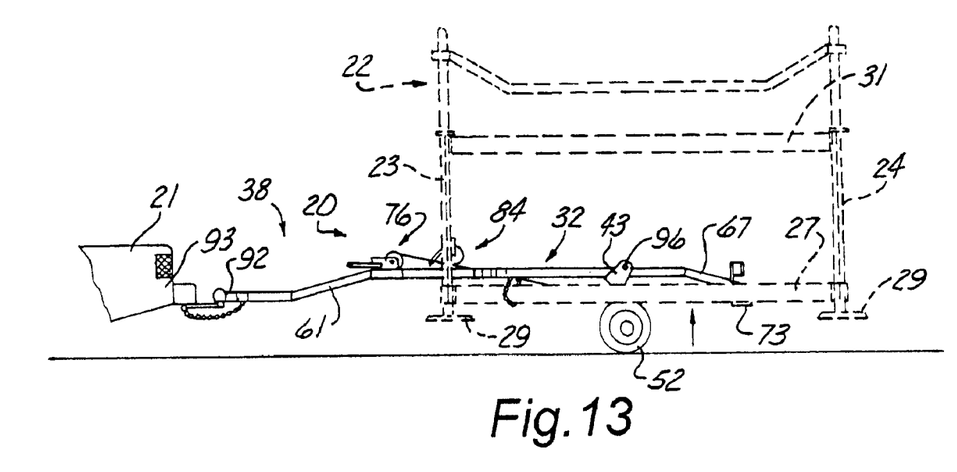
FIG. 13 is a view similar to FIG. 6, wherein the hoist has been lifted by the trailer to a transport position.

The forward winch unit (76) is then operated to winch in the cables (81), (82) thereby pivoting the pivot arms (43), (44) forwardly to raise the trailer frame (32) and the hoist (22) to their transport position (FIG. 13). Tie down chains (97) (FIGS. 9 and 10) are provided on each forward end (36), (37) of the trailer frame (32) for connection to adjacent portions of the hoist side beams (27), (28) to keep the hoist (22) from shifting during transport. The hoist (22) is now ready for transport. To remove the hoist (22) from the trailer (20) after transport, the above process is reversed.

I claim:

1. For use with a boat hoist including a pair of laterally spaced front posts and a pair of laterally spaced rear posts forming a rectangular structure, a front beam extended between the front posts and a pair of laterally spaced side beams extended, respectively, between each set of front and rear posts, the posts mounted on a surface for disposing the beams in a normally horizontal plane, a trailer for transporting the boat hoist comprising:

means forming a frame having a pair of side frame members converged together at their front ends, and diverged at laterally spaced side portions, wherein said side portions extend rearwardly of said front ends in parallel relation;

a wheel and axle unit including a pair of laterally spaced ground surface engaging wheels mounted on said frame;

a first pivot unit pivotally mounted to one of said side portions and engaged with said wheel axle unit on one side of said frame;

a second pivot unit pivotally mounted to the other of said side portions and engaged with said wheel and axle unit on the other side of said frame;

a first winch unit mounted on said frame and connected to said wheel and axle unit, said first winch unit operable to move said wheel and axle unit from a frame lowered position to a frame raised position;

extension support means mounted on said frame for engaging the hoist side beams; and a second winch unit mounted on said frame for engaging the hoist front beam for vertically moving the hoist relative to said trailer frame.

2. The boat hoist transporting trailer of claim 1, and further wherein said first pivot unit includes a first arm having opposite ends, one end pivotally connected to said one side portion, and said opposite end connected to said wheel and axle unit.

3. The boat hoist transporting trailer of claim 2, and further wherein said second pivot unit includes a second arm having opposite ends, one end of said second arm pivotally connected to the other of said side portions, said opposite end of said second arm connected to said wheel and axle unit.

4. The boat hoist transporting trailer of claim 1, said first winch unit including a winch and a pair of cables, each cable having opposite ends, one end of each cable connected to said winch and the opposite end of each cable connected to a said pivot unit arm, wherein rotatable operation of said winch effects simultaneous pivotal movement of both said first and second pivot unit arms.

5. The boat hoist transporting trailer of claim 4, and further wherein said extension support means includes a pair of laterally moveable support members each said support member disposed adjacent a respective side beam and retractably moveable outwardly to a position below the said respective side beam, whereby upward movement of said support members lifts the boat hoist.

6. The boat hoist transporting trailer of claim 5, and further wherein a member is placeable in a surface engaging position adjacent the front beam providing therefore a ramp for said wheels to move over the front beam.

7. A method of transporting a boat hoist having four posts arranged in a rectangular shape with a front beam extended between two front posts and a side beam extended between each pair of side posts, the method comprising the following steps:

backing a trailer over the front beam of the boat hoist and partially into the boat hoist, with the boat hoist and in a ground engaging position, and the trailer maintained in a ground engaging position except as it backs over the front beam of the boat hoist;

moving a frame unit of the trailer vertically from a position wherein the frame unit is in a raised condition to a lowered condition relative to the boat hoist side beams;

laterally extending extension support members of the trailer from non-engaging boat hoist positions to boat hoist-engaged positions;

attaching a lifting member from the trailer to the boat hoist to form a three-point support arrangement of the trailer with the boat hoist;

moving the lifting member whereby the boat hoist is raised upwardly toward the trailer frame; and moving the trailer frame unit vertically from the lowered condition to the raised condition whereby the boat hoist is raised above the ground for transport purposes.

8. An apparatus for transporting a boat hoist, said boat hoist comprising a pair of laterally spaced front posts and a pair of laterally spaced rear posts forming a rectangular structure, a front beam extended between the front posts and a pair of laterally spaced side beams extended, respectively, between each set of front and rear posts, the posts mounted on a surface for disposing the beams in a normally horizontal plane, the apparatus comprising:

(a) a frame;

(b) at least one axle operably affixed to the frame;

(e) at least one wheel operatively, rotatably mounted on the axle;

(d) at least one pivot unit, operatively, pivotably mounted to the frame and engaged with said at least one axle;

(e) a first winch unit mounted on said frame and operatively connected to said at least one axle, said first winch unit operable to move said at least one wheel from a frame lowered position to a frame raised position;

(f) a second winch unit mounted on said frame for engaging the boat hoist front beam for vertically moving the boat hoist relative to to said frame.

9. The apparatus of claim 8, and further wherein said at least one pivot unit includes a first arm having opposite ends, one end operatively, pivotally connected to said frame, and said opposite end connected to said at least one axle.

10. The apparatus of claim 8, said first winch unit including a winch and at least one cable, said at least one cable having opposite ends, one end of the at least one cable connected to said winch and the opposite end of the at least one cable connected to a said at least one pivot unit, wherein rotatable operation of said winch effects simultaneous pivotal movement of said at least one pivot unit.

11. The apparatus of claim 8, additionally comprising extension supports including at least one laterally moveable support member said at least one support member disposed adjacent a side beam and retractably moveable outwardly to a position below the said side beam, whereby upward movement of said at least one support member lifts the boat hoist.

12. The apparatus of claim 8, additionally comprising a ramp, said ramp being placeable in a surface engaging position adjacent the front beam providing therefore a ramp for said at least one wheel to move over the front beam.

13. A method of transporting a boat hoist, said boat hoist having four posts arranged in a rectangular shape with a front beam extended between two front posts and side beams extended between each pair of side posts, the method comprising the steps of:

(a) backing a trailer over the front beam of the boat hoist and partially into the boat hoist, with the boat hoist in a ground engaging position;

(b) moving a frame unit of the trailer vertically from a position wherein the frame unit is in a raised condition to a lowered condition relative to the boat hoist side beams;

(c) lifting the boat hoist upwardly toward the trailer frame with a first winch;

(d) engaging the boat hoist to the trailer; and (e) raising the trailer frame unit vertically from the lowered condition to the raised condition with a second winch whereby the boat hoist is raised above the ground for transport purposes.

* * * * *